US011941105B2

(12) United States Patent
Ogasawara et al.

(10) Patent No.: US 11,941,105 B2
(45) Date of Patent: Mar. 26, 2024

(54) MAINTENANCE DEVICE AND MAINTENANCE METHOD FOR SUBSTRATE PROCESSING APPARATUS

(71) Applicant: SCREEN HOLDINGS CO., LTD., Kyoto (JP)

(72) Inventors: Shinichi Ogasawara, Kyoto (JP); Shoji Kirita, Kyoto (JP)

(73) Assignee: SCREEN HOLDINGS CO., LTD. (JP)

( * ) Notice: Subject to any disclaimer, the term of this patent is extended or adjusted under 35 U.S.C. 154(b) by 432 days.

(21) Appl. No.: 17/256,292

(22) PCT Filed: Apr. 26, 2019

(86) PCT No.: PCT/JP2019/018023
§ 371 (c)(1),
(2) Date: Dec. 28, 2020

(87) PCT Pub. No.: WO2020/003736
PCT Pub. Date: Jan. 2, 2020

(65) Prior Publication Data
US 2021/0264016 A1 Aug. 26, 2021

(30) Foreign Application Priority Data

Jun. 28, 2018 (JP) ................................. 2018-123557

(51) Int. Cl.
*G06F 21/00* (2013.01)
*G06F 21/35* (2013.01)
(Continued)

(52) U.S. Cl.
CPC .............. *G06F 21/44* (2013.01); *G06F 21/35* (2013.01); *H01L 21/67248* (2013.01); *H01L 21/67739* (2013.01); *H04W 4/80* (2018.02)

(58) Field of Classification Search
CPC ........... G06F 21/35; G06F 21/44; H04W 4/80
See application file for complete search history.

(56) References Cited

U.S. PATENT DOCUMENTS 7,388,221 B2    6/2008  Lapstun et al. ............... 250/566
8,031,357 B2   10/2011  Lapstun et al. ............. 358/1.15
(Continued)

FOREIGN PATENT DOCUMENTS

CN    1396625 A    2/2003
CN    1667795 A    9/2005
(Continued)

OTHER PUBLICATIONS

International Search Report dated Jun. 25, 2019 in corresponding PCT International Application No. PCT/JP2019/018023.
(Continued)

*Primary Examiner* — Rodman Alexander Mahmoudi
(74) *Attorney, Agent, or Firm* — OSTROLENK FABER LLP

(57) ABSTRACT

Authentication information is acquired from a storage medium through near field communication in one authentication device. Whether the authentication information corresponds to one substrate processing apparatus at which the authentication device is provided is determined. In a case where the authentication information corresponds to the one substrate processing apparatus, access information is transmitted from the authentication device through near field communication. An instruction terminal receives the access information through near field communication. The instruction terminal accesses a maintenance instruction device based on the access information, whereby a maintenance screen is displayed on a display of the instruction terminal. The instruction terminal has an operation unit to be operated by a user in order to provide an instruction for performing a maintenance operation.

7 Claims, 8 Drawing Sheets

(51) Int. Cl.
*G06F 21/44* (2013.01)
*H01L 21/67* (2006.01)
*H01L 21/677* (2006.01)
*H04W 4/80* (2018.01)

(56) References Cited

U.S. PATENT DOCUMENTS

| | | | |
|---|---|---|---|
| 2001/0017798 A1 | 8/2001 | Ishii | 365/200 |
| 2003/0023340 A1 | 1/2003 | Kitamoto et al. | 700/121 |
| 2005/0140518 A1 | 6/2005 | Chiba | 340/679 |
| 2005/0204196 A1 | 9/2005 | Nishimura et al. | 714/31 |
| 2006/0065859 A1 | 3/2006 | Lapstun et al. | 250/566 |
| 2006/0073654 A1 | 4/2006 | Mori | 438/202 |
| 2006/0206229 A1 | 9/2006 | Kitamoto et al. | 700/121 |
| 2006/0241803 A1 | 10/2006 | Kitamoto et al. | 700/121 |
| 2009/0157214 A1 | 6/2009 | Mori | 700/110 |
| 2010/0182268 A1 | 7/2010 | Lapstun et al. | 345/173 |
| 2011/0093947 A1 | 4/2011 | Kato et al. | 726/16 |
| 2013/0014251 A1* | 1/2013 | Nogami | G06F 21/34 726/19 |
| 2013/0239197 A1 | 9/2013 | Kato et al. | 726/9 |
| 2013/0253689 A1* | 9/2013 | Yoneda | C23C 16/00 700/121 |
| 2014/0240484 A1 | 8/2014 | Kodama et al. | 348/86 |
| 2015/0143460 A1 | 5/2015 | Kato et al. | |
| 2016/0112390 A1 | 4/2016 | Thorgrimsson et al. | |
| 2016/0197960 A1 | 7/2016 | Kato et al. | |
| 2018/0160002 A1 | 6/2018 | Nishiyama | |
| 2019/0221460 A1 | 7/2019 | Mizuguchi et al. | |

FOREIGN PATENT DOCUMENTS

| | | |
|---|---|---|
| CN | 1679141 A | 10/2005 |
| JP | H07-114439 A | 5/1995 |
| JP | 2003-272982 A | 9/2003 |
| JP | 2003-282387 A | 10/2003 |
| JP | 2011-086155 A | 4/2011 |
| JP | TW 201351533 A | 12/2013 |
| JP | 2019-125736 A | 7/2019 |
| KR | 10-2018-0064979 A | 6/2018 |
| KR | 10-2019-0088368 A | 7/2019 |
| TW | 201510909 A | 3/2015 |

OTHER PUBLICATIONS

Written Opinion dated Jun. 25, 2019 in corresponding PCT International Application No. PCT/JP2019/018023.
Office Action dated May 25, 2020 in corresponding Taiwanese Patent Application No. 108115980.
Notice of Allowance dated Jul. 25, 2022 in corresponding Korean Patent Application No. 10-2021-7002791.
Office Action dated Jan. 17, 2024, issued in corresponding Chinese Application No. 201980043410.5.

* cited by examiner

F I G. 4
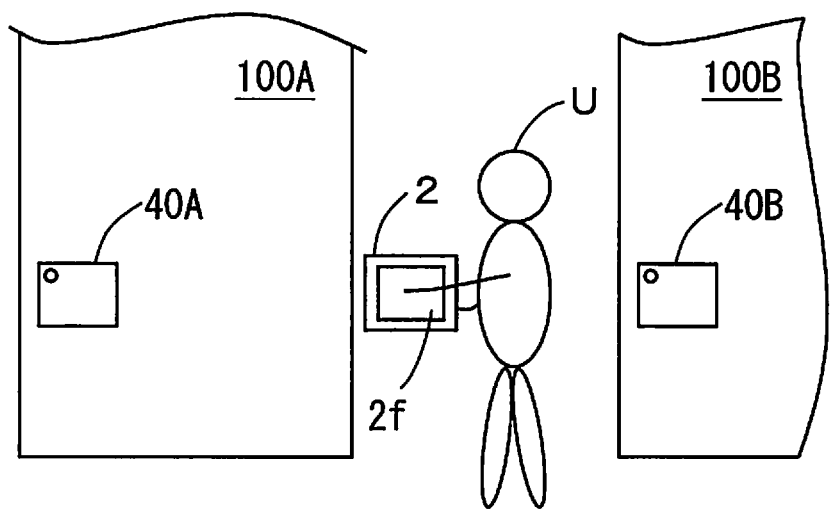

MAINTENANCE DEVICE AND MAINTENANCE METHOD FOR SUBSTRATE PROCESSING APPARATUS

CROSS-REFERENCE TO RELATED APPLICATIONS

The present application is a 35 U.S.C. §§ 371 national phase conversion of International Application No. PCT/JP2019/018023, filed Apr. 26, 2019, which claims priority to Japanese Patent Application No. 2018-123557, filed Jun. 28, 2018, the contents of both of which are incorporated herein by reference. The PCT International Application was published in the Japanese language.

TECHNICAL FIELD

The present invention relates to a maintenance device and a maintenance method for a substrate processing apparatus.

BACKGROUND ART

Substrate processing apparatuses are used to subject various substrates such as semiconductor substrates, substrates for liquid crystal display devices, plasma displays, optical discs, magnetic discs, magneto-optical discs, photomasks and other substrates to various types of processing.

In a substrate processing apparatus, processing is performed on one substrate successively by a plurality of processing units. Further, a substrate is transported by a substrate transport device among the plurality of processing units. When the processing units, the substrate transport device and the like are maintained, a maintenance terminal for adjusting an operation of a device to be maintained is used.

For example, in Patent Document 1, an adjustment terminal is described as the above-mentioned maintenance terminal. A user of the adjustment terminal uses an input mechanism included in the adjustment terminal with one of his or her arms fitted into the adjustment terminal. Thus, an instruction signal that is output from the adjustment terminal is supplied to a control device of the substrate processing apparatus wirelessly or through a wired connection.

[Patent Document 1] JP 7-114439 A

SUMMARY OF INVENTION

Technical Problem

In a factory for semiconductor devices and the like, a large number of substrate processing apparatuses are generally placed in a clean room to be arranged relatively densely. In a case where an operating substrate processing apparatus is stopped erroneously, a large economic loss is generated. Therefore, it is necessary to take measures such that a maintenance worker does not perform a maintenance operation erroneously on an operating substrate processing apparatus. In a case where the worker instructs a substrate processing apparatus to perform a maintenance operation using a wireless instruction terminal, another substrate processing apparatus arranged near a substrate processing apparatus to be maintained may perform a maintenance operation erroneously. As such, a wired instruction terminal corresponding to each substrate processing apparatus is actually used. The worker carries the instruction terminal corresponding to a substrate processing apparatus to be maintained, connects the cable of the instruction terminal to the substrate processing apparatus and then instructs the substrate processing apparatus to be maintained to perform a maintenance operation using the instruction terminal. In this case, the substrate processing apparatus to which the cable is not connected is not instructed to perform the maintenance operation.

However, in a case where the wired instruction terminal is to be used, the worker is required to pull a cable around to perform an operation. Thus, workability is not good. Further, the cable may get caught with various objects, so that the instruction terminal may fail due to disconnection of the cable.

An object of the present invention is to provide a maintenance device and a maintenance method for a substrate processing apparatus which can prevent a substrate processing apparatus not to be maintained from being instructed to perform a maintenance operation erroneously and in which convenience of maintenance is improved.

Solution to Problem (1) A maintenance device for a substrate processing apparatus according to one aspect of the present invention includes a maintenance instruction device provided to correspond to the substrate processing apparatus, a storage medium that stores authentication information corresponding to the substrate processing apparatus, an authentication device that includes a first near field communicator and is provided to correspond to the substrate processing apparatus and an instruction terminal that includes a second near field communicator and a display, wherein each maintenance instruction device produces screen information representing a maintenance screen for maintaining the substrate processing apparatus at which the maintenance instruction device is provided, the authentication device includes a first authentication information acquirer that acquires the authentication information stored in the storage medium using the first near field communicator when the storage medium is present in a communicable range of the first near field communicator of the authentication device, a first determiner that determines whether the authentication information acquired by the first authentication information acquirer corresponds to the substrate processing apparatus at which the authentication device is provided, and an information transmitter that transmits access information for communication between the instruction terminal and the maintenance instruction device provided at the substrate processing apparatus in a case where the acquired authentication information corresponds to the substrate processing apparatus, and does not transmit the access information in a case where the acquired authentication information does not correspond to the substrate processing apparatus, the instruction terminal includes a network accessor that receives the access information using a second near field communicator and accesses the maintenance instruction device provided at the substrate processing apparatus through wireless communication using the received access information when the authentication device is present in a communicable range of the second near field communicator of the instruction terminal and the access information is transmitted using the first near field communicator, a display controller that causes the display to display the maintenance screen based on screen information produced by the maintenance instruction device to which the network accessor has accessed, and an operation unit that is to be operated by a user in order to instruct the substrate processing apparatus to perform a maintenance operation when the maintenance screen is displayed by the display.

In the maintenance device, the maintenance instruction device is provided to correspond to the substrate processing apparatus, and the authentication device is provided to correspond to the substrate processing apparatus. Further, the authentication information corresponding to the substrate processing apparatus is stored in the storage medium.

The user brings the storage medium corresponding to the substrate processing apparatus to be maintained close to the authentication device provided at the substrate processing apparatus. In a case where the storage medium is present in the communicable range of the first near field communicator of the authentication device, the authentication information stored in the storage medium is acquired by the first authentication information acquirer of the authentication device. Further, in the authentication device, whether the acquired authentication information corresponds to the substrate processing apparatus is determined.

In a case where the acquired authentication information corresponds to the substrate processing apparatus, the access information is transmitted from the first near field communicator of the authentication device. In this state, the authentication device is present in the communicable range of the second near field communicator of the instruction terminal, so that the access information is received by the second near field communicator. Thus, the access from the instruction terminal to the maintenance instruction device provided at the substrate processing apparatus is enabled. The instruction terminal accesses the maintenance instruction device, so that the maintenance screen is displayed on the display of the instruction terminal. As such, the user can instruct the substrate processing apparatus to perform a maintenance operation by using the operation unit while making reference to the maintenance screen displayed on the display of the instruction terminal.

In a case where the authentication information acquired in the authentication device does not correspond to the substrate processing apparatus, the access information is not transmitted from the first near field communicator of the authentication device. Thus, the access from the instruction terminal to the maintenance instruction device provided at the substrate processing apparatus is disabled.

With the above-mentioned configuration, in the authentication device provided at the substrate processing apparatus, only in a case where the authentication information of the storage medium carried by the user corresponds to the substrate processing apparatus, the access from the instruction terminal to the maintenance instruction device provided at the substrate processing apparatus is enabled. In a case where the authentication information of the storage medium carried by the user does not correspond to the substrate processing apparatus, the access from the instruction terminal to the maintenance instruction device provided at the substrate processing apparatus is disabled. Therefore, the substrate processing apparatus not to be maintained is prevented from being erroneously instructed to perform the maintenance operation.

Further, with the above-mentioned configuration, the instruction terminal accesses the maintenance instruction device through wireless communication. Therefore, the user does not need to pull a cable for communication around when carrying the instruction terminal. Further, the instruction terminal does not fail due to disconnection of the cable. Therefore, convenience of maintenance is improved.

(2) The information transmitter may transmit the authentication information corresponding to the substrate processing apparatus using the first near field communicator when transmitting the access information using the first near field communicator, and the instruction terminal may further include a subject information storage that receives the authentication information using the second near field communicator and stores the received authentication information as subject information when the authentication device is present in a communicable range of the second near field communicator of the instruction terminal and the authentication information is transmitted using the first near field communicator, a medium holder that holds the storage medium attachably and detachably in a communicable range of the second near field communicator of the instruction terminal, a second authentication information acquirer that acquires authentication information stored in the storage medium using the second near field communicator with the storage medium held by the medium holder, a second determiner that determines whether the authentication information acquired by the second authentication information acquirer matches the subject information stored in the subject information storage, and an access controller that allows access to the maintenance instruction device using the network accessor in a case where the authentication information acquired by the second authentication information acquirer matches the subject information, and restricts access to the maintenance instruction device using the network accessor in a case where the acquired authentication information does not match the subject information.

In the above-mentioned maintenance device, when the access information is transmitted by the first near field communicator of the authentication device, the authentication information corresponding to the substrate processing apparatus at which the authentication device is provided is further transmitted by the first near field communicator.

The user brings the storage medium close to the authentication device and then brings the instruction terminal close to the authentication device. Thus, when the access information is received by the second near field communicator, the authentication information transmitted by the first near field communicator is further received by the second near field communicator. In the instruction terminal, the received authentication information is stored as the subject information.

Next, the user attaches the selected storage medium to the medium holder of the instruction terminal. In this case, because the medium holder is in the communicable range of the second near field communicator, the authentication information stored in the storage medium is acquired by the second near field communicator. As such, in the instruction terminal, whether the acquired authentication information matches the stored subject information is determined.

In a case where the acquired authentication information matches the subject information, the access to the maintenance instruction device using the instruction terminal is allowed. On the other hand, in a case where the acquired authentication information does not match the subject information, the access to the maintenance instruction device using the instruction terminal is restricted. Thus, the maintenance of the substrate processing apparatus using the instruction terminal is restricted to the user who carries the storage medium corresponding to the substrate processing apparatus. Therefore, a third party who does not carry the storage medium corresponding to the substrate processing apparatus is prevented from operating the substrate processing apparatus using the instruction terminal.

(3) The substrate processing apparatus may include a processing liquid supply unit that supplies a processing liquid to a substrate using a nozzle, and the maintenance operation may include an operation of discharging the processing liquid from the nozzle in the processing liquid supply unit.

In this case, in regard to part of substrate processing apparatuses, maintenance of the processing liquid supply unit using the instruction terminal is enabled.

(4) The substrate processing apparatus may include a thermal processing unit that performs thermal processing on a substrate using a temperature adjusting device, and the maintenance operation may include a temperature adjusting operation of the temperature adjusting device in the thermal processing unit.

In this case, in regard to part of substrate processing apparatuses, maintenance of the thermal processing unit using the instruction terminal is enabled.

(5) The substrate processing apparatus may include a transport device that transports a substrate, and the maintenance operation may include a moving operation of the transport device.

In this case, in regard to part of substrate processing apparatuses, maintenance of the transport device using the instruction terminal is enabled.

(6) A maintenance method for a substrate processing apparatus according to another aspect of the present invention includes a step of maintaining the substrate processing apparatus using a maintenance device, wherein the maintenance device includes a maintenance instruction device provided to correspond to the substrate processing apparatus, a storage medium that stores authentication information corresponding to the substrate processing apparatus, an authentication device that includes a first near field communicator and is provided to correspond to the substrate processing apparatus, and an instruction terminal that includes a second near field communicator and a display, and the step of maintaining includes acquiring the authentication information stored in the storage medium using the first near field communicator when the storage medium is present in a communicable range of the first near field communicator of the authentication device, in the authentication device, determining whether the authentication information acquired by the first authentication information acquirer corresponds to the substrate processing apparatus at which the authentication device is provided, in the authentication device, transmitting access information for communication between the instruction terminal and the maintenance instruction device provided at the substrate processing apparatus in a case where the acquired authentication information corresponds to the substrate processing apparatus, and not transmitting the access information in a case where the acquired authentication information does not correspond to the substrate processing apparatus, in the authentication device, receiving the access information using a second near field communicator and accessing the maintenance instruction device provided at the substrate processing apparatus through wireless communication using the received access information when the authentication device is present in a communicable range of the second near field communicator of the instruction terminal and the access information is transmitted using the first near field communicator, in the instruction terminal, producing screen information representing a maintenance screen for maintaining the substrate processing apparatus at which the maintenance instruction device is provided, in the accessed maintenance instruction device, causing the display to display the maintenance screen based on the screen information produced by the accessed maintenance instruction device, in the instruction terminal and instructing the substrate processing apparatus to perform a maintenance operation based on an operation performed on the instruction terminal by a user when the maintenance screen is displayed by the display, in the instruction terminal.

With the maintenance method, in the authentication device provided at the substrate processing apparatus, only in a case where the authentication information of the storage medium carried by the user corresponds to the substrate processing apparatus, the access from the instruction terminal to the maintenance instruction device provided at the substrate processing apparatus is enabled. In a case where the authentication information of the storage medium carried by the user does not correspond to the substrate processing apparatus, the access from the instruction terminal to the maintenance instruction device provided at the substrate processing apparatus is disabled. Therefore, the substrate processing apparatus not to be maintained is prevented from being erroneously instructed to perform the maintenance operation.

Further, with the above-mentioned configuration, the instruction terminal accesses the maintenance instruction device through wireless communication. Therefore, the user does not need to pull a cable for communication around when carrying the instruction terminal. Further, the instruction terminal does not fail due to disconnection of the cable. Therefore, convenience of maintenance is improved.

(7) The step of maintaining may further includes transmitting authentication information corresponding to the substrate processing apparatus using the first near field communicator when the access information is transmitted using the first near field communicator, in the authentication device, receiving the authentication information using the second near field communicator and storing the received authentication information as subject information when the authentication device is present in a communicable range of the second near field communicator of the instruction terminal and the authentication information is transmitted using the first near field communicator, in the instruction terminal, causing the instruction terminal to hold the storage medium in a communicable range of the second near field communicator of the instruction terminal, acquiring authentication information stored in the held storage medium using the second near field communicator with the storage medium held, in the instruction terminal, determining whether the acquired authentication information matches the stored subject information, in the instruction terminal, and allowing access to the maintenance instruction device in a case where the acquired authentication information matches the subject information, and restricting access to the maintenance instruction device in a case where the acquired authentication information does not match the subject information, in the instruction terminal.

With the above-mentioned method, the maintenance of the substrate processing apparatus using the instruction terminal is restricted to the user who carries the storage medium corresponding to the substrate processing apparatus. Therefore, a third party who does not carry the storage medium corresponding to the substrate processing apparatus is prevented from operating the substrate processing apparatus using the instruction terminal.

Advantageous Effects of Invention

The present invention can prevent a substrate processing apparatus not to be maintained from being erroneously instructed to perform a maintenance operation and improves convenience of maintenance.

BRIEF DESCRIPTION OF THE DRAWINGS

FIG. 4 is a diagram for explaining one example of maintenance using the maintenance device of FIG. 1.

DESCRIPTION OF EMBODIMENTS

A maintenance device and a maintenance method according to one embodiment of the present invention will be described below with reference to the drawings. In the following description, a substrate refers to a substrate for an FPD (Flat Panel Display) that is used for a liquid crystal display device, an organic EL (Electro Luminescence) display device or the like, a semiconductor substrate, a substrate for an optical disc, a substrate for a magnetic disc, a substrate for a magneto-optical disc, a substrate for a photomask, a ceramic substrate, a substrate for a solar cells or the like.

[1] Basic Configuration and Outline of Maintenance Device

Figure 1:
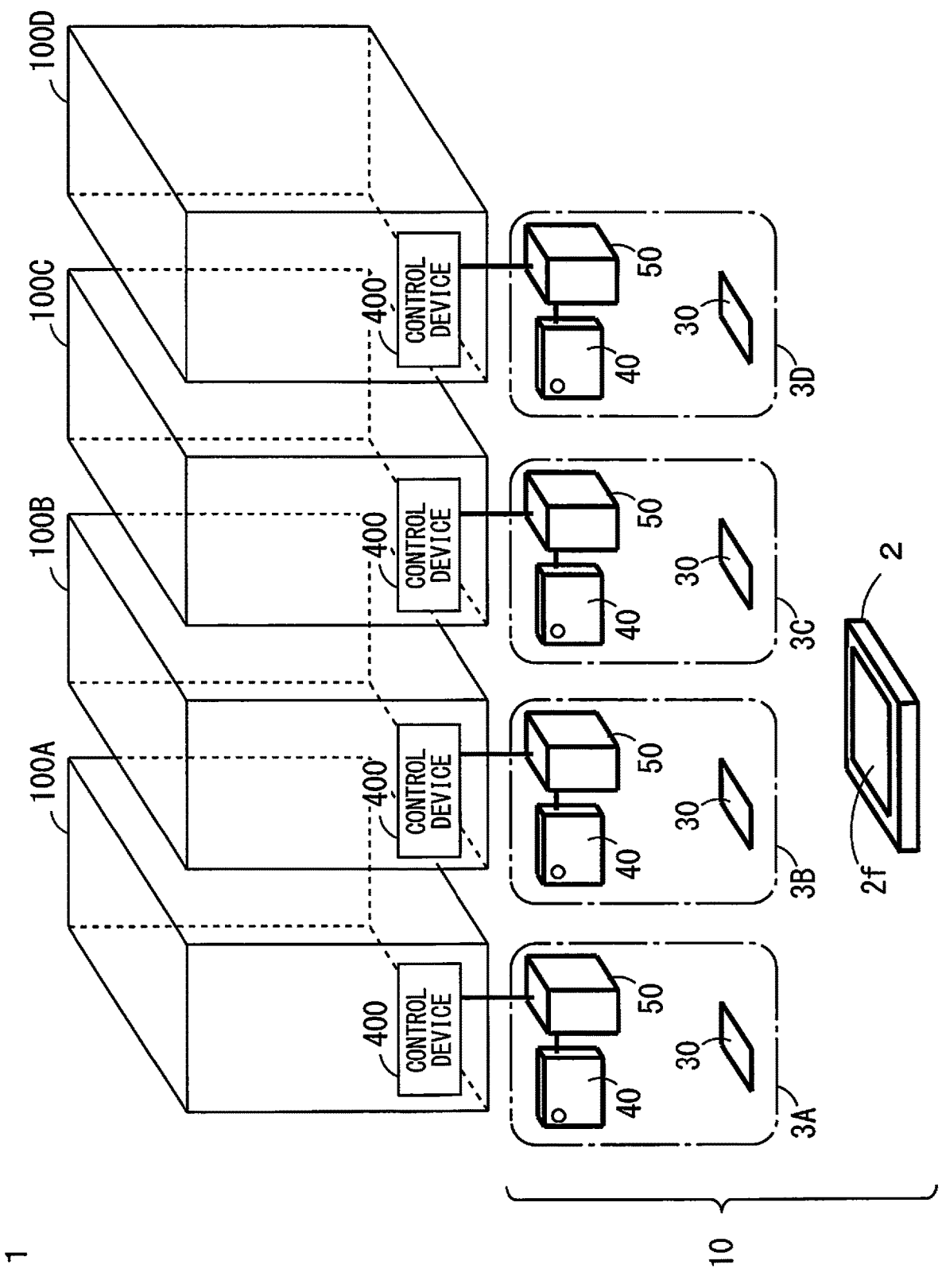
FIG. 1 is a diagram showing the basic configuration of a maintenance device according to one embodiment of the present invention.

FIG. 1 is a diagram showing the basic configuration of the maintenance device according to the one embodiment of the present invention. The maintenance device 10 of FIG. 1 is used to maintain four substrate processing apparatuses 100A to 100D. Each of the four substrate processing apparatuses 100A to 100D includes a control device 400 for controlling each constituent element of the substrate processing apparatus.

Figure 5:
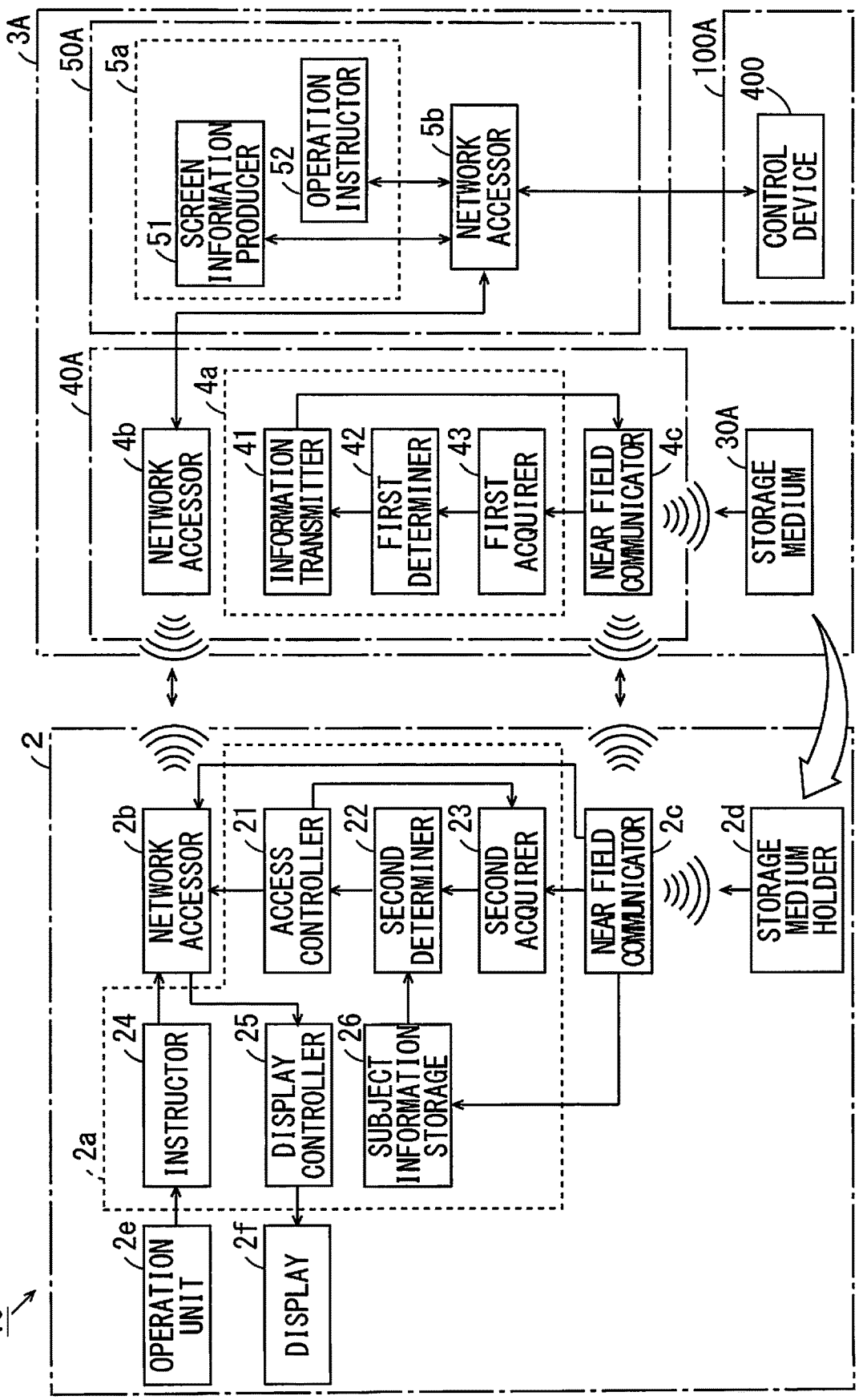
FIG. 5 is a block diagram showing the configuration of an instruction terminal and a remote communication system of FIG. 1.

As shown in FIG. 1, the maintenance device 10 includes an instruction terminal 2 and four remote communication systems 3A to 3D. The instruction terminal 2 is a device that can be carried by a user of a tablet terminal, a smartphone or a mobile phase, for example, and has a display 2f and an operation unit 2e (FIG. 5).

A maintenance screen for maintenance of any one of the plurality of substrate processing apparatuses 100A to 100D is displayed on the display 2f. The operation unit 2e (FIG. 5) is a touch panel provided on the display 2f, for example. The user operates the operation unit 2e while viewing the maintenance screen displayed on the display 2f. Thus, a substrate processing apparatus to be maintained can be instructed to perform a desired maintaining operation. Details of the configuration and operation of the instruction terminal 2 will be described below.

The four remote communication systems 3A to 3D respectively correspond to the four substrate processing apparatuses 100A to 100D in advance. Each of the remote communication systems 3A to 3D includes a storage medium 30, an authentication device 40 and a maintenance instruction device 50. An authentication device 40 and a maintenance instruction device 50 are provided at a corresponding substrate processing apparatus and connected to be communicable with each other using a communication cable.

A storage medium 30 is configured such that information is readable with no contact through near field communication, and the storage medium 30 stores unique authentication information that is predetermined in a corresponding substrate processing apparatus. That is, a storage medium 30 stores the authentication information that corresponds to and is unique to a substrate processing apparatus.

An authentication device 40 is configured to be capable of acquiring the authentication information stored in a storage medium 30 through near field communication. Further, an authentication device 40 has a router function for establishing wireless communication between the instruction terminal 2 and a maintenance instruction device 50. Details of the configuration and operation of an authentication device 40 will be described below.

A maintenance instruction device 50 produces screen information representing a maintenance screen in regard to a corresponding substrate processing apparatus and supplies the produced screen information to the instruction terminal 2 through an authentication device 40. Further, a maintenance instruction device 50 is provided to be communicable with a control device 400 of a corresponding substrate processing apparatus and gives an instruction for performing a maintenance operation supplied from the instruction terminal 2 through an authentication device 40 to a control device 400 of the corresponding substrate processing apparatus. Details of the configuration and operation of a maintenance instruction device 50 will be described below.

[2] Usage Example of Maintenance Device 10

FIGS. 2A to 4 are diagrams for explaining one example of maintenance using the maintenance device 10 of FIG. 1. In the following description, the storage media 30 included in the remote communication systems 3A, 3B, 3C, 3D of FIG. 1 are respectively referred to as storage media 30A, 30B, 30C, 30D. Further, the authentication devices 40 included in the remote communication systems 3A, 3B, 3C, 3D of FIG. 1 are respectively referred to as authentication devices 40A, 40B, 40C, 40D. Further, the maintenance instruction devices 50 included in the remote communication systems 3A, 3B, 3C, 3D of FIG. 1 are respectively referred to as maintenance instruction devices 50A, 50B, 50D, 50D.

First, the user U of the maintenance device 10 determines a substrate processing apparatus to be maintained from among the four substrate processing apparatuses 100A, 100B, 100C, 100D to which the remote communication systems 3A to 3D correspond.

Figure 2A:
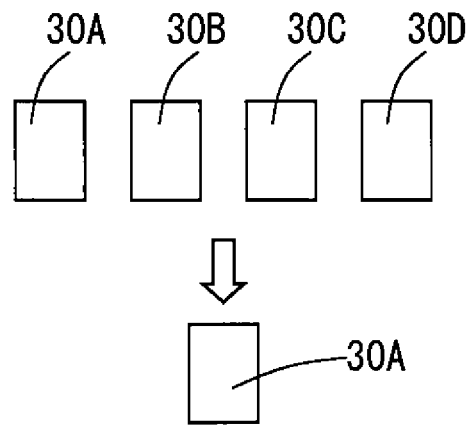
FIGS. 2A and 2B are diagrams for explaining one example of maintenance using the maintenance device of FIG. 1.
Figure 2B:
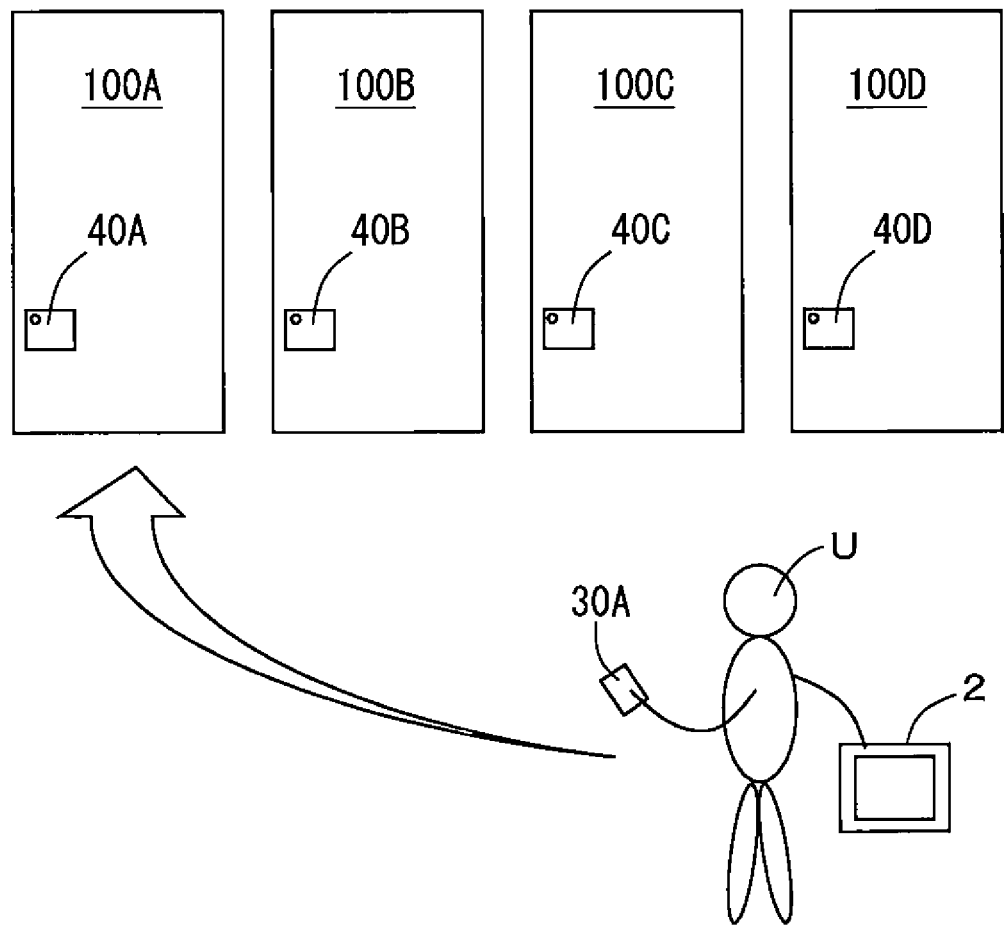

In a case where the substrate processing apparatus 100A is determined as a substrate processing apparatus to be maintained, for example, the user U selects the storage medium 30A corresponding to the substrate processing apparatus 100A to be maintained from among the four storage media 30A to 30D as shown in FIG. 2A. Thereafter, as shown in FIG. 2B, the user U moves to a position in the vicinity of the substrate processing apparatus 100A while carrying the selected storage medium 30A and the instruction terminal 2.

In each of the substrate processing apparatuses 100A to 100D, each of the authentication devices 40A to 40D of the remote communication systems 3A to 3D corresponding to the substrate processing apparatuses is provided at a portion of an outer wall of the device or a position in the vicinity of the operation panel of the device, for example.

Figure 3A:
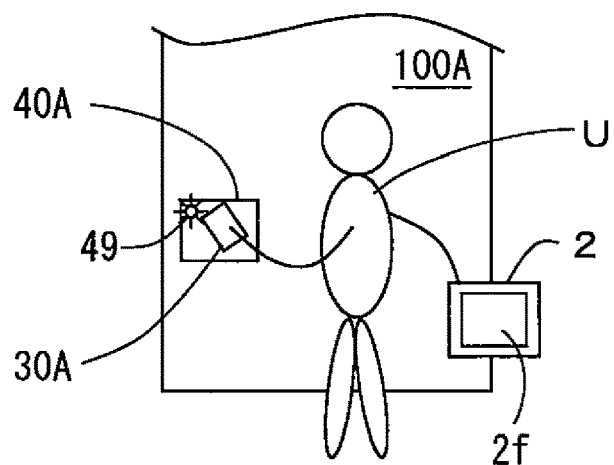
FIGS. 3A to 3C are diagrams for explaining one example of maintenance using the maintenance device of FIG. 1.

As shown in FIG. 3A, the user U brings the selected storage medium 30A close to the authentication device 40A. Thus, the authentication information stored in the storage medium is acquired by the authentication device 40A through near field communication.

An indicator light 49 is provided in each of the authentication devices 40A to 40D. The indicator light 49 lights up for a certain period of time from a point in time at which the authentication information is acquired in the authentication device and goes out when the authentication information is not acquired. Thus, the user U can identify whether the authentication information of the storage medium 30A is acquired by the authentication device 40A based on a lit state or an unlit state of the indicator light 49.

Here, the authentication information corresponding to the substrate processing apparatus 100A is stored in the authentication device 40A in advance. In the authentication device 40A, whether the authentication information acquired from the storage medium matches the authentication information stored in advance is determined. That is, whether the authentication information of the storage medium (the storage medium 30A in the present example) that is brought close by the user U corresponds to the substrate processing apparatus (the substrate processing apparatus 100A in the present example) at which the authentication device 40A is provided is determined.

Figure 3B:
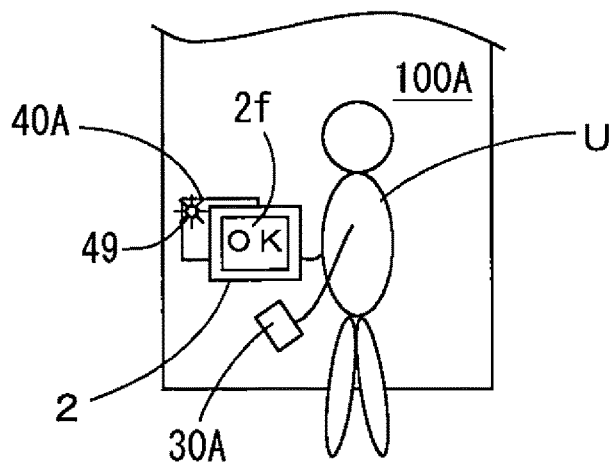

When confirming acquisition of the authentication information of the storage medium 30A by the authentication device 40A based on a lit state of the indicator light 49, the user U brings the instruction terminal 2 close to the authentication device 40A as shown in FIG. 3B.

Near field communicators 2c, 4c (FIG. 5), described below, are respectively provided in the instruction terminal 2 and the authentication device 40A. Thus, when the near field communicators 2c, 4c are present in each other's communicable ranges, near field communication is enabled between the instruction terminal 2 and the authentication device 40A. In a case where the authentication information acquired in the authentication device 40A corresponds to the substrate processing apparatus 100A, access information and the authentication information corresponding to the substrate processing apparatus 100A are transmitted from the authentication device 40A. At this time, the instruction terminal 2 receives the access information and the authentication information transmitted from the authentication device 40A. On the other hand, in a case where the authentication information acquired in the authentication device 40A does not correspond to the substrate processing apparatus 100A, the access information and the authentication information are not transmitted from the authentication device 40A.

When the access information is received by the instruction terminal 2, the information indicating reception of the access information in the instruction terminal 2 is displayed on the display 2f of the instruction terminal 2.

Here, the access information is the information for the access from the instruction terminal 2 to the maintenance instruction device 50A with the authentication device 40A as an access point. In the access information, an SSID (Service set identifier) and a password of the authentication device 40A, and an IP (Internet protocol) address of the maintenance instruction device 50A, for example, are included.

Figure 3C:
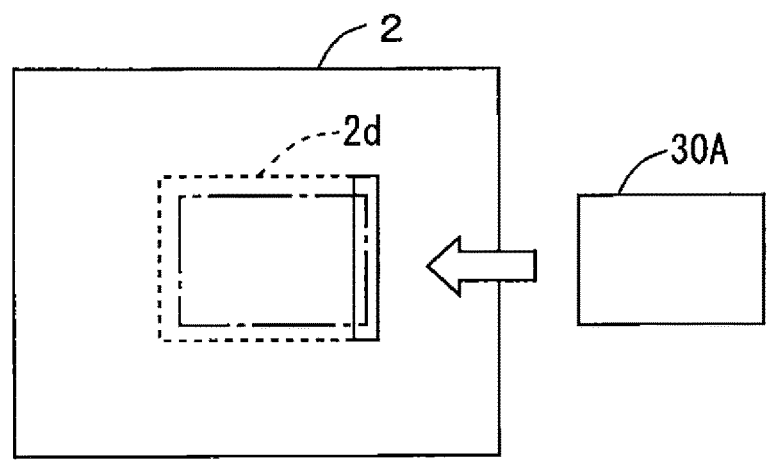

The instruction terminal 2 has a substantially rectangular plate shape and has one surface and another surface facing each other. The display 2f is provided on the one surface of the instruction terminal 2. As shown in FIG. 3C, a storage medium holder 2d into and from which the storage medium 30A can be inserted and extracted is provided at the other surface of the instruction terminal 2. The user U confirms reception of the access information in the instruction terminal 2 and then inserts the storage medium 30A into the storage medium holder 2d.

In this case, in the instruction terminal 2, the authentication information is acquired in a predetermined period from the storage medium 30A held by the storage medium holder 2d through near field communication. Further, whether the acquired authentication information matches the authentication information transmitted from the authentication device 40A (the authentication information corresponding to the substrate processing apparatus 100A in the present example) is determined. Moreover, in a case where the acquired authentication information matches the authentication information transmitted from the authentication device 40A, the access between the instruction terminal 2 and the maintenance instruction device 50A is allowed. On the other hand, in a case where the authentication information is not acquired or the acquired authentication information does not match the authentication information transmitted from the authentication device 40A, the access between the instruction terminal 2 and the maintenance instruction device 50A is restricted.

In a case where the access between the instruction terminal 2 and the maintenance instruction device 50A is allowed, the maintenance screen is displayed on the display 2f of the instruction terminal 2 based on the screen information produced in the maintenance instruction device 50A. Therefore, as shown in FIG. 4, the user U can operate the operation unit 2e (FIG. 5) of the instruction terminal 2 while making reference to the maintenance screen. In this case, an instruction for performing a maintenance operation based on an operation of the user U is given to the control device 400 of the substrate processing apparatus 100A through the maintenance instruction device 50A. In this manner, a so-called remote desktop connection is established among the instruction terminal 2, the maintenance instruction device 50A and the control device 400.

[3] Details of Configuration of Maintenance Device 10

Details of the configuration and operation of the maintenance device 10 of FIG. 1 will be described. The plurality of remote communication systems 3A to 3D of FIG. 1 have the same configuration. As such, in the following description, the configuration and operation of the remote communication system 3A out of the plurality of remote communication systems 3A to 3D will be described representatively.

FIG. 5 is a block diagram showing the configuration of the instruction terminal 2 and the remote communication system 3A of FIG. 1. As shown in FIG. 5, the instruction terminal 2 includes a controller 2a, a network accessor 2b, a near field communicator 2c, the storage medium holder 2d, the operation unit 2e and the display 2f.

The network accessor 2b has a built-in antenna, and receives the access information transmitted from the remote communication system 3A using the near field communicator 2c in a case where the authentication device 40A is present in a communicable range of the near field communicator 2c. Further, the network accessor 2b is configured to be capable of communicating wirelessly utilizing a network using the received access information. On the other hand, the near field communicator 2c has a built-in antenna and is configured to be capable of executing near field communication utilizing an NFC (Near field communication) technique. With the NFC, wireless communication is executed in a range of about 10 cm. The storage medium holder 2d is provided at a position in close proximity to the near field communicator 2c. Any one of the storage media 30A to 30D is inserted into the storage medium holder 2d, whereby the storage medium is present in a communicable range of the near field communicator 2c.

The display 2f is constituted by an LCD (Liquid Crystal display) panel or an organic EL (Electroluminescence) panel. The operation unit 2e is a touch panel provided on the display 2f as described above. The operation unit 2e may be constituted by one or a plurality of switches in addition to the touch panel or instead of the touch panel.

The controller 2a is constituted by a CPU (Central Processing Unit) and a memory, for example. The controller 2a includes an access controller 21, a second determiner 22, a second acquirer 23, an instructor 24, a display controller 25 and a subject information storage 26 as functions. These functions are implemented by execution of a program for maintenance stored in the memory in advance by the CPU of the controller 2a. Part or all of the plurality of above-mentioned constituent elements included in the controller 2a may be implemented by hardware such as an electronic circuit.

The access controller 21 allows or restricts access to the maintenance instruction device 50A by the network accessor 2b based on a result of determination of the second determiner 22, described below.

In a case where the authentication device 40A is present in a communicable range of the near field communicator 2c, the subject information storage 26 receives the authentication information transmitted from the remote communication system 3A using the near field communicator 2c. Further, the subject information storage 26 stores the received authentication information as subject information.

In a case where any one of the storage media 30A to 30D is present in a communicable range of the near field communicator 2c, the second acquirer 23 acquires the authentication information of the storage medium using the near field communicator 2c.

The second determiner 22 determines whether the authentication information acquired by the second acquirer 23 corresponds to the substrate processing apparatus 100A at which the remote communication system 3A is provided based on the subject information stored in the subject information storage 26.

In a case where the access information is received by the near field communicator 2c, the display controller 25 causes the display 2f to display the reception of the access information in the instruction terminal 2. Further, the display controller 25 causes the display 2f to display the maintenance screen based on the screen information acquired from the maintenance instruction device 50A through the network accessor 2b.

The instructor 24 supplies a signal for an instruction of a maintenance operation to the maintenance instruction device 50A through the network accessor 2b based on an operation performed on the operation unit 2e by the user U.

The remote communication system 3A includes the storage medium 30A, the authentication device 40A and the maintenance instruction device 50A. The storage medium 30A is an IC (Integrated Circuit) card, for example, and stores the authentication information corresponding to the substrate processing apparatus 100A at which the remote communication system 3A is provided in advance.

The authentication device 40A is a cradle, for example, and includes a controller 4a, a network accessor 4b and the near field communicator 4c. The network accessor 4b has a built-in antenna and a built-in router and is configured to be capable of operating as an access point of wireless communication. The network accessor 4b is connected to a network accessor 5b of the maintenance instruction device 50A, described below, through a cable for communication. In this case, the cable is a LAN (Local Area Network) cable, for example. Similarly to the near field communicator 2c, the near field communicator 4c has a built-in antenna and is configured to be capable of executing near field communication using an NFC technique. The authentication device 40A includes the indicator light 49 of FIGS. 3A to 3C in addition to the configuration shown in FIG. 5. The indicator light 49 includes an LED (light-emitting diode) as a lighting source.

The controller 4a is constituted by a CPU (Central Processing Unit) and a memory, for example. The controller 4a includes an information transmitter 41, a first determiner 42 and a first acquirer 43 as functions. These functions are implemented by execution of a program for maintenance stored in the memory in advance by the CPU of the controller 4a. Part or all of the plurality of above-mentioned constituent elements included in the controller 4a may be realized by hardware such as an electronic circuit.

In a case where any one of the storage media 30A to 30D is present in a communicable range of the near field communicator 4c, the first acquirer 43 acquires the authentication information of the storage medium using the near field communicator 4c. Further, in a case where acquiring the authentication information, the first acquirer 43 causes the indicator light 49 of FIGS. 3A to 3C to light up for a predetermined period of time.

In the first determiner 42, the authentication information corresponding to the substrate processing apparatus 100A at which the remote communication system 3A is provided is stored in advance. As such, the first determiner 42 determines whether the authentication information acquired by the first acquirer 43 is the authentication information corresponding to the substrate processing apparatus 100A at which the remote communication system 3A is provided.

The information transmitter 41 transmits the access information and the authentication information corresponding to the substrate processing apparatus 100A using the near field communicator 4c based on the result of determination of the first determiner 42. Specifically, in a case where the acquired authentication information corresponds to the substrate processing apparatus 100A, the information transmitter 41 transmits the access information and the authentication information corresponding to the substrate processing apparatus 100A using the near field communicator 4c.

The maintenance instruction device 50A is a server or a personal computer, for example, and includes a controller 5a and the network accessor 5b. The network accessor 5b is configured to be capable of communication utilizing a network. As described above, the network accessor 5b is connected to the network accessor 4b of the authentication device 40A through a wired connection and is connected to the control device 400 of the substrate processing apparatus 100A through a wired connection.

The controller 5a is constituted by a CPU (Central Processing Unit) and a memory, for example. The controller 5a includes a screen information producer 51 and an operation instructor 52 as functions. These functions are implemented by execution of a program for maintenance stored in the memory in advance by the controller 5a. Part or all of the plurality of above-mentioned constituent elements included in the controller 5a may be realized by hardware such as an electronic circuit.

The screen information producer 51 communicates with the control device 400 of the substrate processing apparatus 100A through the network accessor 5b, thereby producing the screen information corresponding to an operating state of the substrate processing apparatus 100A. Further, the screen information producer 51 supplies the produced screen information to the instruction terminal 2 in response to a request from the instruction terminal 2.

The operation instructor 52 gives an instruction for performing a maintenance operation given from the instruction terminal 2 to the control device 400 of the substrate processing apparatus 100A through the network accessor 5b. Thus, the maintenance operation, which the control device 400 was instructed by the instruction terminal 2 to perform, is performed in the substrate processing apparatus 100A.

[4] Flow of Series of Processes in Authentication Device 40A

Figure 6:
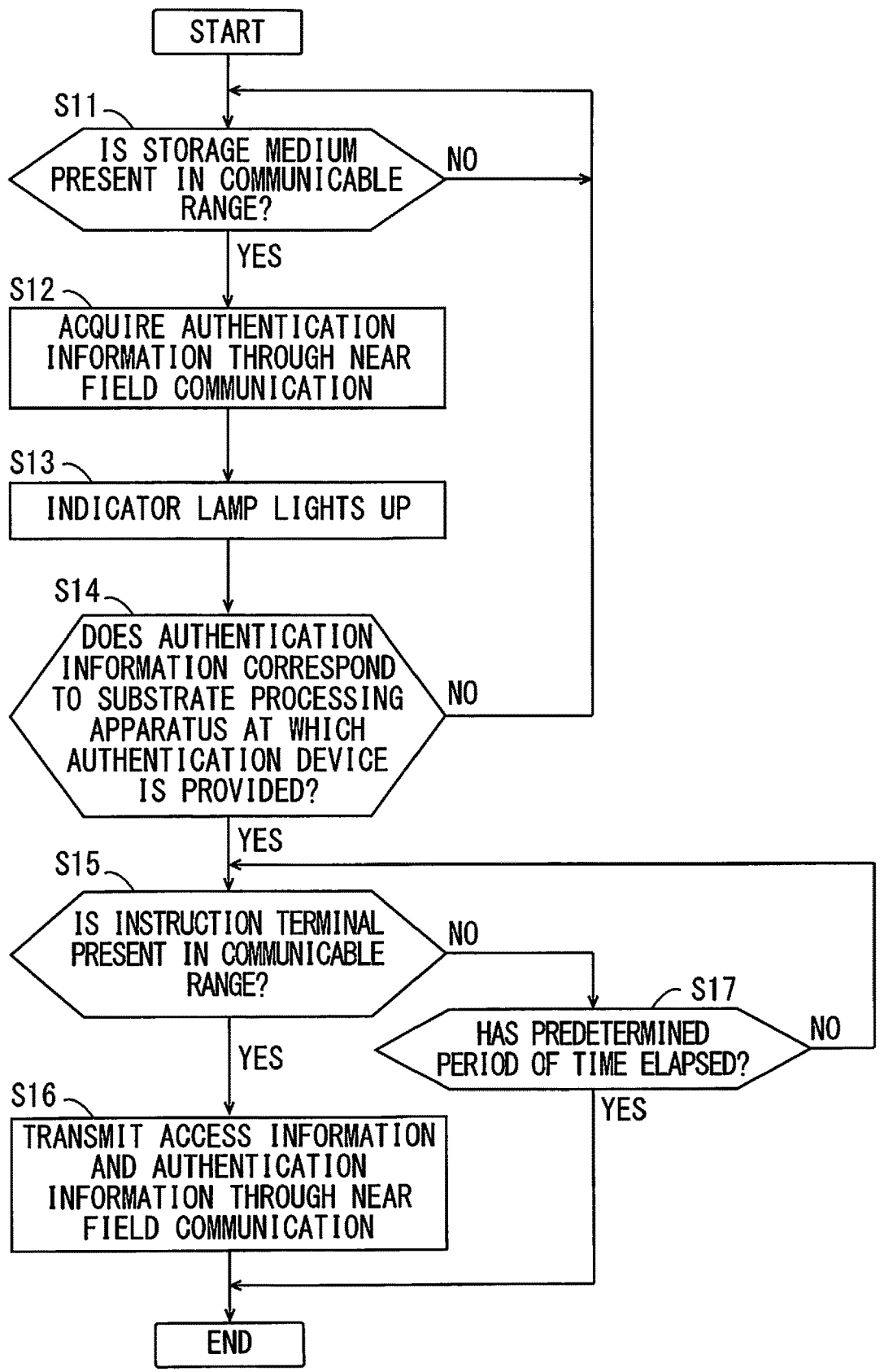
FIG. 6 is a flowchart showing a flow of a series of processes in an authentication device.

FIG. 6 is a flowchart showing a flow of a series of processes in the authentication device 40A. The series of processes shown in FIG. 6 are started in a case where the substrate processing apparatus 100A at which the remote communication system 3A is provided is powered or a case where it is notified that the substrate processing apparatus 100A is to be maintained, for example.

First, the first acquirer 43 of FIG. 5 determines whether any one of the storage media 30A to 30D is present in the communicable range of the near field communicator 4c (step S11). In a case where a storage medium is not present in the communicable range, the first acquirer 43 repeats the process of the step S11. On the other hand, in a case where a storage medium is present in the communicable range, the first acquirer 43 acquires the authentication information of the storage medium using the near field communicator 4c (step S12) and controls and causes the indicator light 49 of FIGS. 3A to 3C to light up for a predetermined period of time (step S13).

Next, the first determiner 42 of FIG. 5 determines whether the authentication information acquired by the first acquirer 43 is the authentication information corresponding to the substrate processing apparatus 100A at which the authentication device 40A is provided (step S14). In a case where the authentication information corresponds to the substrate processing apparatus 100A, the information transmitter 41 of FIG. 5 determines whether the instruction terminal 2 is present in the communicable range of the near field communicator 4c (step S15).

In a case where the instruction terminal 2 is present in the communicable range, the information transmitter 41 transmits the access information and the authentication information corresponding to the substrate processing apparatus 100A using the near field communicator 4c (step S16) and ends the series of processes.

In the above-mentioned step S14, in a case where the authentication information does not correspond to the substrate processing apparatus 100A, the first acquirer 43 returns to the process of the step S11. Further, in the above-mentioned step S15, in a case where the instruction terminal 2 is not present in the communicable range, the information transmitter 41 determines whether a predetermined period of time has elapsed since the previous process of the step S14 (step S17).

Then, in a case where the predetermined period of time has not elapsed, the information transmitter 41 returns to the process of the step S15. On the other hand, in a case where the predetermined period of time has elapsed, the information transmitter 41 ends the series of processes.

The series of above-mentioned processes may be restarted in a case where a predetermined period of time has elapsed after the end of the series of processes or a case where it is notified again that the substrate processing apparatus 100A is to be maintained after the end of the series of processes.

[5] Flow of Series of Processes in Instruction Terminal 2

Figure 7:
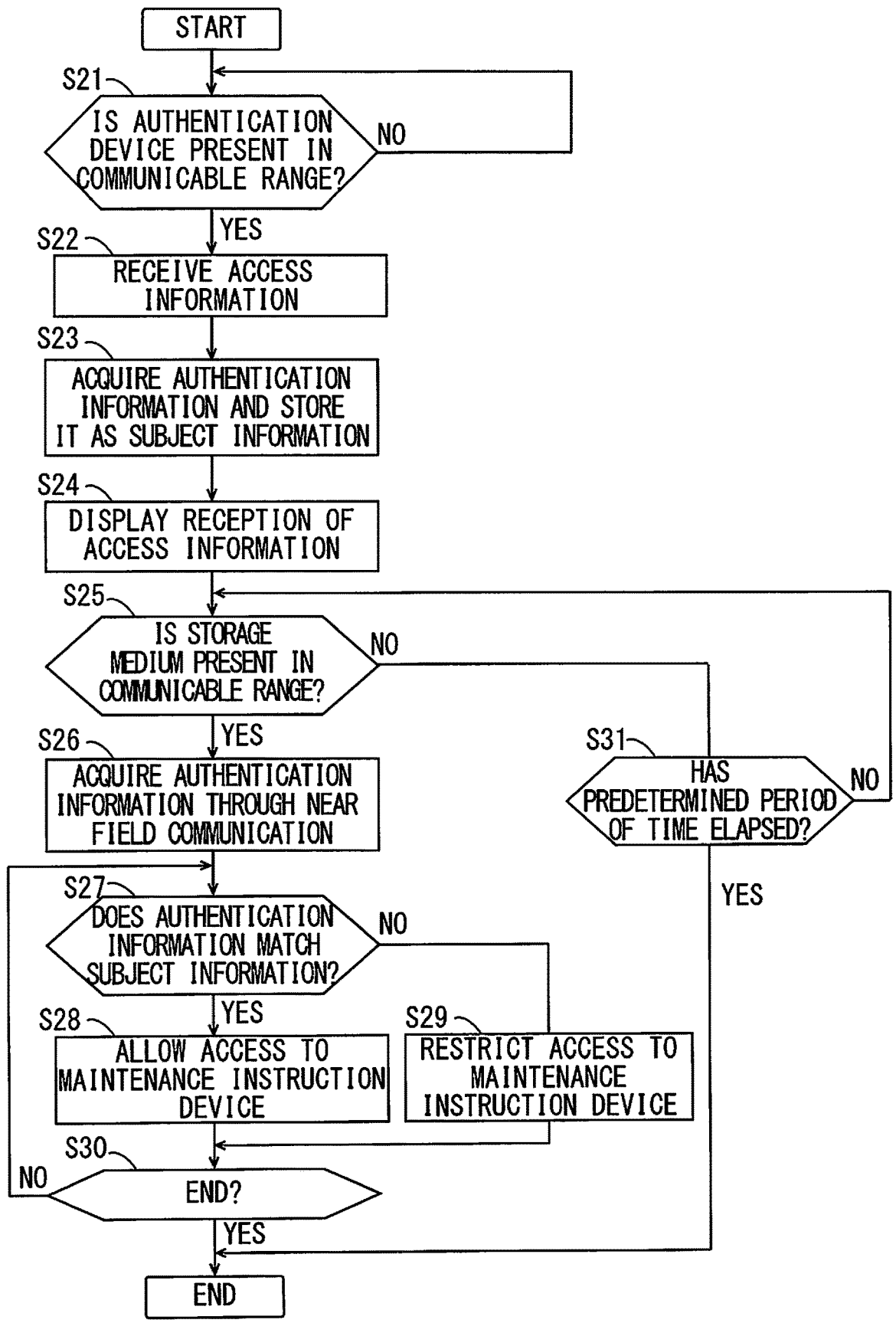
FIG. 7 is a flowchart showing a flow of a series of processes in the instruction terminal.

FIG. 7 is a flowchart showing a flow of a series of processes in the instruction terminal 2. The series of processes shown in FIG. 7 are started in a case where the instruction terminal 2 is powered, for example.

First, the access controller 21 of FIG. 5 determines whether any one of the authentication devices 40A to 40D is present in a communicable range of the near field communicator 2c (step S21). In a case where an authentication device is not present in the communicable range, the access controller 21 repeats the process of the step S21. On the other hand, in a case where an authentication device is present in the communicable range, the access controller 21 receives the access information transmitted from the authentication device in the above-mentioned process of the step S16 using the near field communicator 2c (step S22). Further, the subject information storage 26 of FIG. 5 receives the authentication information transmitted from the authentication device in the above-mentioned process of the step S16 using the near field communicator 2c and stores the authentication information as the subject information (step S23). Further, the display controller 25 of FIG. 5 causes the display 2f to display reception of the access information (step S24).

Thereafter, the second acquirer 23 of FIG. 5 determines whether any one of the storage media 30A to 30D is present in the communicable range of the near field communicator 2c (step S25). In a case where a storage medium is present in the communicable range, the second acquirer 23 acquires the authentication information of the storage medium using the near field communicator 2c (step S26).

Next, the second determiner 22 of FIG. 5 determines whether the authentication information acquired in the previous process of the step S26 matches the subject information based on the subject information stored in the subject information storage 26 in the previous process of the step S23 (step S27).

In a case where the authentication information matches the subject information, the access controller 21 allows the network accessor 2b of FIG. 5 to access the maintenance instruction device based on the access information received in the step S22 (step S28). On the other hand, in a case where the authentication information does not match the subject information, the access controller 21 restricts the network accessor 2b of FIG. 5 from accessing the maintenance instruction device based on the access information received in the step S22 (step S29).

Thereafter, the access controller 21 determines whether an instruction for ending the process has been given based on an operation performed on the operation unit 2e by the user U (step S30). In a case where the instruction for ending the process has been given, the access controller 21 ends the series of processes. On the other hand, in a case where the instruction for ending the process has not been given, the access controller 21 returns to the process of the step S27.

In a case where a storage medium is not present in the communicable range in the above-mentioned step S25, the second acquirer 23 determines whether a predetermined period of time has elapsed since the previous process of the step S24 (step S31). Then, in a case where the predetermined period of time has not elapsed, the second acquirer 23 returns to the process of the step S25. On the other hand, in a case where the predetermined period of time has elapsed, the second acquirer 23 ends the series of processes.

In the instruction terminal 2, with the access to the maintenance instruction device allowed in the above-mentioned process of the step S27, a maintenance screen is displayed in regard to the substrate processing apparatus corresponding to the maintenance instruction device. Further, with the access to the maintenance instruction device allowed, the substrate processing apparatus corresponding to the maintenance instruction device can be instructed to perform various maintenance operations.

[6] Overall Configuration of Substrate Processing Apparatus 100A

Figure 8:
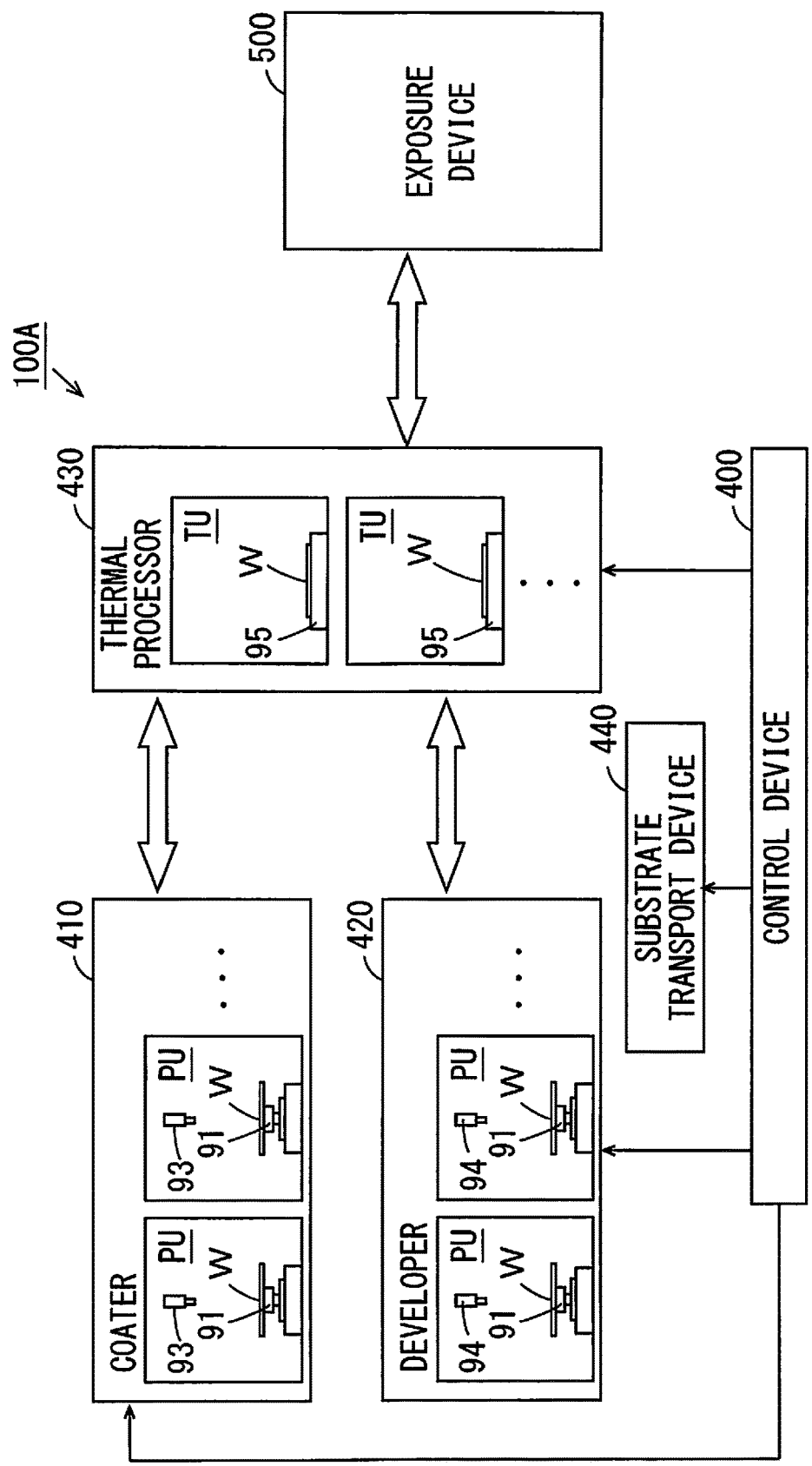
FIG. 8 is a schematic block diagram showing one example of a substrate processing apparatus of FIG. 1.

FIG. 8 is a schematic block diagram showing one example of the substrate processing apparatus 100A of FIG. 1. As shown in FIG. 8, the substrate processing apparatus 100A is provided to be adjacent to an exposure device 500, for example, and includes a control device 400, a coater 410, a developer 420, a thermal processor 430 and a substrate transport device 440.

The control device 400 includes a CPU, a memory or a microcomputer, for example, and controls the operations of the coater 410, the developer 420, the thermal processor 430 and the substrate transport device 440. When the substrate processing apparatus 100A is maintained, the control device 400 controls an operation of each member in the substrate processing apparatus 100A such that the maintenance operation is performed as instructed in response to an instruction given from the above-mentioned instruction terminal 2.

The substrate transport device 440 transports a substrate W among the coater 410, the developer 420, the thermal processor 430 and the exposure device 500.

Each of the coater 410 and the developer 420 includes a plurality of processing units PU. In a processing unit PU provided in the coater 410, a processing liquid nozzle 93 that supplies a processing liquid for forming a resist film on the substrate W rotated by a spin chuck 91 is provided. Thus, a resist film is formed on the unprocessed substrate W. Exposure processing is performed on the substrate W on which the resist film is formed in the exposure device 500.

In a processing unit PU provided in the developer 420, a development liquid nozzle 94 that supplies a development liquid to the substrate W rotated by a spin chuck 91 is provided. Thus, the substrate W after the exposure processing by the exposure device 500 is developed.

The thermal processor 430 includes a plurality of processing units TU that perform heating processing or cooling processing on the substrate W. In the processing unit TU, a temperature adjusting plate 95 is provided as a substrate supporter. The temperature adjusting plate 95 is a heating plate or a cooling plate. In the thermal processor 430, the thermal processing is performed on the substrate W before and after the coating processing by the coater 410, the development processing by the developer 420 and the exposure processing by the exposure device 500.

In the above-mentioned substrate processing apparatus 100, a processing unit PU that forms an anti-reflection film on the substrate W may be provided in the coater 410. In this case, a processing unit TU for performing adhesion reinforcing processing for improving adhesion between the substrate W and the anti-reflection film may be provided in the coater 410. Further, in the coater 410, a processing unit PU that forms a resist cover film for protecting a resist film formed on the substrate W may be provided.

Further, in the above-mentioned substrate processing apparatus 100A, a substrate platform on which the substrate W being transported by the substrate transport device 440 is temporarily placed may be provided. The substrate platform has the configuration in which a plurality (three, for example) of support pins are provided as substrate supporters, for example.

In regard to the substrate processing apparatus 100A having the above-mentioned configuration, the maintenance operation, which the instruction terminal 2 can give an instruction for performing, includes an operation of discharging the processing liquid from the processing liquid nozzle 93 in the coater 410 and an operation of discharging the development liquid from the development liquid nozzle 94 in the developer 420, for example.

Further, the maintenance operation, which the instruction terminal 2 can give an instruction for performing, includes a temperature adjusting operation of the temperature adjusting plate 95 in the thermal processor 430. Further, the maintenance operation, which the instruction terminal 2 can give an instruction for performing, includes a moving operation of the substrate transport device 440.

The substrate processing apparatuses 100B to 100D of FIG. 1 may have the same configuration as that of the above-mentioned substrate processing apparatus 100A of FIG. 8 or may have a different configuration.

[7] Effects (a) In the above-mentioned maintenance device 10, the selected storage medium 30 is brought close to the authentication device 40 by the user U. At this time, only in a case where the authentication information of the storage medium 30 corresponds to the substrate processing apparatus at which the authentication device 40 is provided, the access from the instruction terminal 2 to the maintenance instruction device 50 provided at the substrate processing apparatus is enabled. In a case where the authentication information does not correspond to the substrate processing apparatus at which the authentication device 40 is provided, the access from the instruction terminal 2 to the maintenance instruction device 50 provided at the substrate processing apparatus is disabled. Therefore, the substrate processing apparatus not to be maintained is prevented from being erroneously instructed to perform the maintenance operation.

Further, in the above-mentioned maintenance device 10, the instruction terminal 2 accesses the maintenance instruction device 50 through the authentication device 40 using wireless communication. Therefore, the user U does not need to pull a cable for communication around when carrying the instruction terminal 2. Further, the instruction terminal 2 does not fail due to disconnection of the cable. Thus, a reduction in convenience of maintenance is suppressed.

(b) In the instruction terminal 2, in a case where the authentication information is received together with the access information, the received authentication information is stored as the subject information. Thereafter, a storage medium is attached to the storage medium holder 2*d* of the instruction terminal 2, and the authentication information of the storage medium is acquired by the near field communicator 2*c*.

In a case where the acquired authentication information matches the subject information, the access to the maintenance instruction device 50 using the instruction terminal 2 is allowed. On the other hand, in a case where the acquired authentication information does not match the subject information, the access to the maintenance instruction device 50 using the instruction terminal 2 is restricted. Thus, the maintenance of the substrate processing apparatus using the instruction terminal 2 is restricted to the user U who carries the storage medium corresponding to the substrate processing apparatus. Therefore, a third party who does not carry the storage medium corresponding to the substrate processing apparatus is prevented from operating the substrate processing apparatus using the instruction terminal 2.

[8] Other Embodiments (a) While the maintenance device 10 according to the above-mentioned embodiment includes the one instruction terminal 2 with respect to the plurality of the remote communication systems 3A to 3D, the maintenance device 10 may include a plurality of instruction terminals 2. In this case, a plurality of users U can maintain a plurality of substrate processing apparatuses at the same time by respectively using the plurality of instruction terminals 2 and a plurality of storage media 30. Even in such a case, each user U is prevented from erroneously instructing his or her substrate processing apparatus that is not to be maintained to perform a maintenance operation.

(b) While each of the plurality of remote communication systems 3A to 3D includes one storage medium 30 in the maintenance device 10 according to the above-mentioned embodiment, the present invention is not limited to this.

A plurality of storage media 30 may be provided in each of the remote communication systems 3A to 3D. Further, in the plurality of storage media 30 of each of the remote communication systems 3A to 3D, a plurality of different authentication information pieces that correspond to a substrate processing apparatus at which the remote communication system is provided may be stored. Further, in the maintenance instruction device corresponding to each substrate processing apparatus, a plurality of screen information pieces representing a plurality of maintenance screens respectively corresponding to a plurality of authentication information pieces may be produced.

In this case, a plurality of users U perform a series of above-mentioned authentication work using instruction terminals 2 and storage media 30 in regard to one remote communication system, whereby an individual maintenance screen can be displayed in each instruction terminal 2. Therefore, in regard to one remote communication system, a plurality of maintaining operations can be performed at the same time.

[9] Correspondences Between Constituent Elements in Claims and Parts in Preferred Embodiments In the following paragraphs, non-limiting examples of correspondences between various elements recited in the claims below and those described above with respect to various preferred embodiments of the present disclosure are explained.

In the above-mentioned embodiment, the near field communicator 4*c* is an example of a first near field communicator, the first acquirer 43 is an example of a first authentication information acquirer, the storage medium holder 2*d* is an example of a medium holder, the second acquirer 23 is an example of a second authentication information acquirer, the processing unit PU provided in the coater 410 and the developer 420 is an example of a processing liquid supply unit, the processing liquid nozzle 93 and the development liquid nozzle 94 are examples of a nozzle, the processing unit TU provided in the thermal processor 430 is an example of a thermal processing unit, the temperature adjusting plate 95 is an example of a temperature adjusting device and the substrate transport device 440 is an example of a transport device.

As each of various elements recited in the claims, various other elements having configurations or functions described in the claims can be also used.

The invention claimed is:

1. A maintenance device for a substrate processing apparatus comprising:
  a maintenance instruction device provided to correspond to the substrate processing apparatus;
  a storage medium that stores authentication information corresponding to the substrate processing apparatus;
  an authentication device that includes a first near field communicator and is provided to correspond to the substrate processing apparatus; and
  an instruction terminal that includes a second near field communicator and a display, wherein
  the maintenance instruction device produces screen information representing a maintenance screen for maintaining the substrate processing apparatus at which the maintenance instruction device is provided,
  the authentication device includes
  a first authentication information acquirer that acquires the authentication information stored in the storage medium using the first near field communicator when the storage medium is present in a communicable range of the first near field communicator of the authentication device,
  a first determiner that determines whether the authentication information acquired by the first authentication information acquirer corresponds to the substrate processing apparatus at which the authentication device is provided, and
  an information transmitter that transmits access information for communication between the instruction terminal and the maintenance instruction device provided at the substrate processing apparatus in a case where the acquired authentication information corresponds to the substrate processing apparatus, and does not transmit the access information in a case where the acquired authentication information does not correspond to the substrate processing apparatus,
  the instruction terminal includes a network accessor that receives the access information using the second near field communicator and accesses the maintenance instruction device provided at the substrate processing apparatus through wireless communication using the received access information when the authentication device is present in a communicable range of the second near field communicator of the instruction terminal and the access information is transmitted using the first near field communicator, a display controller that causes the display to display the maintenance screen based on screen information produced by the maintenance instruction device to which the network accessor has accessed, and an operation unit that is to be operated by a user in order to instruct the substrate processing apparatus to perform a maintenance operation when the maintenance screen is displayed by the display.

2. The maintenance device for the substrate processing apparatus according to claim 1, wherein the information transmitter transmits the authentication information corresponding to the substrate processing apparatus using the first near field communicator when transmitting the access information using the first near field communicator, and the instruction terminal further includes a subject information storage that receives the authentication information using the second near field communicator and stores the received authentication information as subject information when the authentication device is present in a communicable range of the second near field communicator of the instruction terminal and the authentication information is transmitted using the first near field communicator, a medium holder that holds the storage medium attachably and detachably in a communicable range of the second near field communicator of the instruction terminal, a second authentication information acquirer that acquires authentication information stored in the storage medium using the second near field communicator with the storage medium held by the medium holder, a second determiner that determines whether the authentication information acquired by the second authentication information acquirer matches the subject information stored in the subject information storage, and an access controller that allows access to the maintenance instruction device using the network accessor in a case where the authentication information acquired by the second authentication information acquirer matches the subject information, and restricts access to the maintenance instruction device using the network accessor in a case where the acquired authentication information does not match the subject information.

3. The maintenance device for the substrate processing apparatus according to claim 1, wherein the substrate processing apparatus includes a processing liquid supply unit that supplies a processing liquid to a substrate using a nozzle, and the maintenance operation includes an operation of discharging the processing liquid from the nozzle in the processing liquid supply unit.

4. The maintenance device for the substrate processing apparatus according to claim 1, wherein the substrate processing apparatus includes a thermal processing unit that performs thermal processing on a substrate using a temperature adjusting device, and the maintenance operation includes a temperature adjusting operation of the temperature adjusting device in the thermal processing unit.

5. The maintenance device for the substrate processing apparatus according to claim 1, wherein the substrate processing apparatus includes a transport device that transports a substrate, and the maintenance operation includes a moving operation of the transport device.

6. A maintenance method for a substrate processing apparatus including a step of maintaining the substrate processing apparatus using a maintenance device, the maintenance device comprising:

a maintenance instruction device provided to correspond to the substrate processing apparatus;

a storage medium that stores authentication information corresponding to the substrate processing apparatus;

an authentication device that includes a first near field communicator and is provided to correspond to the substrate processing apparatus; and an instruction terminal that includes a second near field communicator and a display, and the step of maintaining includes acquiring the authentication information stored in the storage medium using the first near field communicator when the storage medium is present in a communicable range of the first near field communicator of the authentication device, in the authentication device;

determining whether the authentication information acquired by the first near field communicator corresponds to the substrate processing apparatus at which the authentication device is provided, in the authentication device;

transmitting access information for communication between the instruction terminal and the maintenance instruction device provided at the substrate processing apparatus in a case where the acquired authentication information corresponds to the substrate processing apparatus, and not transmitting the access information in a case where the acquired authentication information does not correspond to the substrate processing apparatus, in the authentication device;

receiving the access information using the second near field communicator and accessing the maintenance instruction device provided at the substrate processing apparatus through wireless communication using the received access information when the authentication device is present in a communicable range of the second near field communicator of the instruction terminal and the access information is transmitted using the first near field communicator, in the instruction terminal;

producing screen information representing a maintenance screen for maintaining the substrate processing apparatus at which the maintenance instruction device is provided, in the accessed maintenance instruction device;

causing the display to display the maintenance screen based on the screen information produced by the accessed maintenance instruction device, in the instruction terminal; and instructing the substrate processing apparatus to perform a maintenance operation based on an operation performed on the instruction terminal by a user when the maintenance screen is displayed by the display, in the instruction terminal.

7. The maintenance method for the substrate processing apparatus according to claim 6, the step of maintaining further includes:

transmitting authentication information corresponding to the substrate processing apparatus using the first near field communicator when the access information is transmitted using the first near field communicator, in the authentication device;

receiving the authentication information using the second near field communicator and storing the received authentication information as subject information when the authentication device is present in a communicable range of the second near field communicator of the instruction terminal and the authentication information is transmitted using the first near field communicator, in the instruction terminal;

causing the instruction terminal to hold the storage medium in a communicable range of the second near field communicator of the instruction terminal;

acquiring authentication information stored in the held storage medium using the second near field communicator with the storage medium held, in the instruction terminal;

determining whether the acquired authentication information matches the stored subject information, in the instruction terminal; and allowing access to the maintenance instruction device in a case where the acquired authentication information matches the subject information, and restricting access to the maintenance instruction device in a case where the acquired authentication information does not match the subject information, in the instruction terminal.

\* \* \* \* \*